(12) United States Patent
Tsukamoto et al.

(10) Patent No.: US 7,420,125 B2
(45) Date of Patent: Sep. 2, 2008

(54) GROMMET ASSEMBLY

(75) Inventors: Masashi Tsukamoto, Toyota (JP); Koji Ikeda, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/302,236

(22) Filed: Dec. 14, 2005

(65) Prior Publication Data

US 2006/0160385 A1 Jul. 20, 2006

(30) Foreign Application Priority Data

Jan. 7, 2005 (JP) ............................ P2005-002262

(51) Int. Cl.
*H02G 3/22* (2006.01)
*H02G 3/18* (2006.01)
(52) U.S. Cl. ............... 174/153 G; 174/650; 174/152 G; 16/2.1; 16/2.2; 248/56
(58) Field of Classification Search ............... 174/480, 174/481, 650, 652, 659, 668, 72 A, 152 G, 174/153 G, 152 R, 153 R, 135; 16/2.1, 2.2; 248/56; 49/501, 502; 296/146.11, 146.9
See application file for complete search history.

(56) References Cited

U.S. PATENT DOCUMENTS

| | | | | |
|---|---|---|---|---|
| 5,405,672 A * | 4/1995 | Takiguchi et al. | ........ | 296/146.9 |
| 5,588,260 A * | 12/1996 | Suzuki et al. | ................. | 49/502 |
| 6,051,790 A * | 4/2000 | Takeuchi et al. | .......... | 174/72 A |
| 6,312,046 B1 * | 11/2001 | Sora et al. | ............... | 174/152 G |
| 6,431,642 B2 * | 8/2002 | Sora et al. | ............... | 174/153 G |
| 6,479,748 B2 * | 11/2002 | Mori | ...................... | 174/152 G |
| 6,825,416 B2 * | 11/2004 | Okuhara | ................. | 174/153 G |
| 6,901,627 B2 * | 6/2005 | Uchida | ......................... | 16/2.1 |
| 7,020,931 B1 * | 4/2006 | Burnett et al. | .......... | 174/152 G |
| 7,053,304 B2 * | 5/2006 | Ojima et al. | .............. | 174/72 A |
| 7,053,305 B2 * | 5/2006 | Takase et al. | ............. | 174/72 A |
| 7,100,237 B2 * | 9/2006 | Katayama | ..................... | 16/2.1 |

FOREIGN PATENT DOCUMENTS

| JP | 11-20573 A | 1/1999 |
|---|---|---|
| JP | 2001-354085 A | 12/2001 |

* cited by examiner

*Primary Examiner*—Angel R Estrada
(74) *Attorney, Agent, or Firm*—Sughrue Mion, PLLC

(57) ABSTRACT

Provided is a grommet assembly including an elastic grommet main body and hard inner members to be fitted into the collar part of the grommet main body where openings for inserting electric wires are notched in part of the peripheral wall of the inner member. A lid wall is closed on an opening by way of a locking unit. A cover for protecting electric wires is integrally arranged on the inner member. The outer peripheral surface of the collar part is clamped between a door panel and a door trim. The cover is locked to the door trim by way of the locking unit. An elastic pressing member is arranged on the door trim in order to engage the pressing member with the inside of the collar part of the grommet main body thus clamping the collar part between itself and the door trim.

15 Claims, 14 Drawing Sheets

GROMMET ASSEMBLY

BACKGROUND OF THE INVENTION

1. Field of the Invention

The present invention relates to a door grommet assembly to be assembled, with excellent water resistance, to a door of an automobile with a plurality of electric wires inserted and its assembly structure.

2. Related Art

FIG. 15 shows the form of a related art door grommet assembly (refer to JP-A-2001-354085).

The door grommet assembly 81 is composed of a grommet main body 82 made of a synthetic rubber, a hard inner member 83 made of a synthetic resin insert-molded into the grommet main body 82, and a protector 84 locked as opposed to the inner member 83.

The grommet main body 82 is composed of a collar part 85, a bellows part 86 protruding from the collar part, and a cup-shaped part 87 integrated with the front end of the bellows part 86. On the inner surface of the collar part 85 is integrally formed the inner member 83. In the inner member 83 is provided a hole 88 in communication with the bellows part 86. From the collar part 85 is protruded backward an electric wire guide plate for the inner member 83. In the collar part 85 are provided a fixing hole 89 and a hard sleeve inside the same.

The protector 84 is formed of a synthetic resin in the approximately V-shape and has a slanted peripheral wall 90 on its periphery as well as a plate part 91 opposed to the electric wire guide plate. On the tip of the protector 84 is provided a locking projection 92. The inner member 83 includes an engaging hole corresponding to the locking projection 92. To the plate part 91 is fixed by tape winding a wound bundle of a plurality of electric wires.

A grommet fitting groove 94 is provided from the front end wall to the inner wall of a metallic inner panel 93 of an automobile door. The fitting groove 94 includes a shallow groove part 94a for fitting the collar part 85 of the grommet main body 82 and a deep groove part 94b for fitting the protector 84. In the bottom of the shallow groove part 94a are provided a hole 95 and a nut (not shown) at the rear side thereof.

As shown in FIG. 16, a plurality of electric wires 97 are laid along the inner panel 93 of the automobile door 96. Connectors 98 of terminals of the electric wire 97 are connected to accessories such as a power window motor, a door lock unit, a loudspeaker and a door mirror unit inside the door.

The collar part 85 of the grommet main body 82 is fixed to the front end wall of the inner panel 93 with a bolt 99 in close contact with the wall surface of the fitting groove 94 to provide favorable water resistance. The bellows part 86 of the grommet main body 82 is arranged between the grommet main body 82 and a vehicle body (nit shown). The cup-shaped part 87 is fitted to the hole in the vehicle body.

A weatherstrip (not shown) is arranged on the collar part 85 of the grommet main body 82. The inner panel 93 and an outer panel 100 constitute the door panel 96. To the inner panel 93 is attached a door trim (not shown) made of a synthetic resin.

The related art door grommet assembly 81 requires threading an electric wire 97 through the hole 88 in the inner member 83 and fastening the bolt 99 for fixing the grommet to the door panel 93. This presents a problem of poor assembly workability that requires a large number of man-hours of assembly and a problem of an increased management cost and overall product cost due to an increased number of components such as the bolt 99, the inner member 83 and the protector 84 for protecting electric wires.

SUMMARY OF THE INVENTION

In view of the above problems, an object of the invention is to provide a grommet assembly and its assembly structure that allow assembly work with good workability and a reduced number of components and that show reliable water resistance.

In order to attain the object, a first aspect of the invention provides a grommet assembly comprising an elastic grommet main body and a hard inner member fitted into the collar part of the grommet main body, characterized in that an opening for inserting an electric wire is notched in a portion of the peripheral wall of the inner member.

With this configuration, a plurality of electric wires is inserted into the inner space of the inner member from the opening, with the inner member fitted into the collar part of the grommet main body in this state. The collar part is brought in close contact with the inner surface of the hole in the door to assure water resistance. The inner member prevents possible collapse of the collar part, or enhances its stiffness, to enhance adhesion to the inner surface of the hole in the door.

A second aspect of the invention provides the grommet assembly according to the first aspect, characterized in that the opening is closed by a lid wall by a locking mechanism.

With this configuration, the opening in the inner member is closed by the lid wall after insertion of electric wires and the lid wall is locked by the inner member. The lid wall serves as a part of the inner member. By closing the lid wall, the stiffness of the inner member is enhanced. With the lid wall closed, the inner member is attached inside the collar part of the grommet main body.

A third aspect of the invention provides the grommet assembly according to the first or second aspect, characterized in that the inner member is integrated with a cover for protecting electric wires.

With this configuration, interference between the electric wires and the components inside the door is prevented by the cover. Moreover, the direction of leading out the electric wires is determined by the cover. The inner member and the cover (cover main body) constitute an inner-integrated cover as a single component.

A fourth aspect of the invention provides the grommet assembly according to the third aspect, characterized in that the cover has an electric wire fixing part.

With this configuration, a wound bundle of electric wires is fixed to the electric wire fixing part of the cover by tape winding with the inner member fitted into the collar part of the grommet main body and the grommet assembly is assembled to the interior of the door together with the wound bundle of electric wires. By fixing the cover and the electric wires, a wire harness with a grommet attached is provided.

A fifth aspect of the invention provides the grommet assembly structure of the grommet assembly for assembling the grommet assembly according to any one of the first through fourth aspects to an automobile door, characterized in that the outer peripheral surface of the collar part is secured while being clamped by a door panel and a door trim.

With this configuration, a door trim is assembled to a door panel and the outer peripheral surface of the collar part of the grommet main body is brought into close contact with the inner surface of the door panel and that of the door trim so as to assure improved water resistance of the electric wire inserting part of an automobile door. It is preferable, for example, that the inner surface of the door panel be bent along the shape of the collar part. The grommet assembly is preferably fixed to the door trim or the door panel in advance.

A sixth aspect of the invention provides the grommet assembly structure of the grommet assembly according to the fifth aspect, characterized in that the lip part provided on the outer peripheral surface of the collar part is in close contact with the door panel and the door trim.

With this configuration, the lip part on the entire periphery of the collar part is brought into close contact with the inner surface of the door panel and that of the door trim in order to improve water resistance.

A seventh aspect of the invention provides the grommet assembly structure of the grommet assembly for assembling the grommet assembly according to the third or fourth aspect to an automobile door, characterized in that the cover is locked to the door trim by a locking mechanism.

With this configuration, the cover is locked to the door trim and the grommet assembly and the wound bundle of electric wires are assembled to the door trim to form a door trim assembly (door trim module). In this state, the door trim assembly is assembled to the door panel. At the same time, the collar part of the grommet main body is secured while being clamped by the door panel and the door trim. The door trim has accessories such as a switch unit and a loudspeaker as well as the grommet assembly assembled thereto so as to form a door trim assembly.

An eighth aspect of the invention provides the grommet assembly structure of the grommet assembly for assembling the grommet assembly according to the first aspect to an automobile door, characterized in that an elastic pressing member is provided on the door trim and that the pressing member is engaged with the inner surface of the collar part of the grommet main body to clamp the collar part collar part between itself and the door trim.

With this configuration, the grommet assembly is fixed to the door trim by the pressing member and the external surface of the collar part of the grommet main body is pressed against the inner surface of the door trim by the energization force of the pressing member so as to be brought into close contact with the door trim. The door trim is assembled to the door panel while the grommet assembly is being fixed.

A ninth aspect of the invention provides the grommet assembly structure of the grommet assembly according to the eighth aspect, characterized in that the pressing member includes a narrow part engaged with the opening of the inner member and a wide part in pressure contact with the projection walls on both sides of the opening.

With this configuration, the narrow part of the pressing member is engaged with the opening of the inner member in the collar part of the grommet main body and the wide part is engaged with the inner member. Thus, the grommet assembly is firmly secured to the door trim without inclination or rattling so that the recessed part (inner member) and the protruding part (pressing member) will be engaged with each other. At the narrow part, the grommet assembly is correctly positioned on the door trim. The narrow part directly presses the collar part against the door trim and the wide part presses the collar part against the door trim via the inner member. The narrow part is fitted to the opening in the inner member thus enhancing the stiffness of the inner member and preventing possible collapse of the collar part by an external pressure.

A tenth aspect of the invention provides the grommet assembly structure of the grommet assembly according to the eighth or ninth aspect, characterized in that the inner member and the pressing member are locked by a locking mechanism.

With this configuration, the inner member is locked to the pressing member so that the grommet assembly is firmly secured to the door trim. This prevents dislocation of the grommet assembly even in case the electric wire is pulled strongly. The grommet assembly is firmly secured by the pushing force of the pressing member and the locking mechanism. In case a locking projection and an engaging recessed part are used as locking mechanism, the pressing member rides on the locking projection and is bent while causing the grommet assembly to slide along the door trim. At the same time the locking projection is engaged with the engaging recessed part, the pressing member is elastically restored to clamp the collar part between itself and the door trim. When the pressing member rides on the locking projection of the inner member, the pressing member does not come into sliding contact with the collar part of the elastic grommet main body having a large coefficient of friction so that the assembling resistance of the grommet assembly with respect to the door trim is reduced.

As described above, according to the first aspect of the invention, it is readily possible to insert an electric wire to the inside of the inner member as well as install the inner member to the electric wire. This improves the assembly workability of the grommet assembly.

According to the second aspect of the invention, the stiffness of the collar part of the grommet main body is enhanced by enhancing the inner member with the lid wall closed. This enhances adhesion between the collar part and the door thereby improving water resistance.

According to the third aspect of the invention, the electric wires are reliably protected by the cover without being affected by external interference. The direction of leading out the electric wires is determined by the cover so as to improve the installation workability of the wire harness on the door. The inner member and the cover are integrated into a single component, which reduces the component management cost and manufacturing cost.

According to the fourth aspect of the invention, the wound bundle of electric wires is stably supported in the cover. It is thus possible to facilitate the electric wire installation workability while reliably protecting the electric wire.

According to the fifth aspect of the invention, it is possible to assure water resistance of a part (electric wire insertion part) between the door trim and the door panel by using the collar part of the grommet main body at the same time the door trim is assembled to the door panel. This eliminates the need for screw fastening work for waterproofing as required by a related art grommet assembly, thereby improving the assembly workability.

According to the sixth aspect of the invention, the lip part of the outer periphery of the collar part is brought into close contact with the inner surface of the door panel and that of the door trim, thereby improving the water resistance of an automobile door.

According to the seventh aspect of the invention, the grommet assembly and the wound bundle of electric wires are assembled to the door trim and then the door trim is assembled to the door panel. This improves the assembly workability of an automobile door.

According to the eighth aspect of the invention, it is possible to easily fix the grommet assembly to the door trim by using the pressing member. This improves the assembly workability of the grommet assembly. The collar part of the grommet main body is pressed against the door trim by the pressing member, which adds to water resistance.

According to the ninth aspect of the invention, the grommet assembly is firmly secured to the door trim while being positioned by the door trim so that the protruding part of the pressing member will be engaged with the recessed part of the inner member. This ensures that the grommet assembly is kept engaged while the door trim is being assembled to the door panel, thus improving the assembly workability of the door trim. The pressing member is engaged with the opening in the inner member to enhance the stiffness of the inner member, which prevents possible collapse of the collar part and brings the outer peripheral surface of the collar part into close contact with the door trim and the door panel thus enhancing water resistance.

According to the tenth aspect of the invention, the grommet assembly is locked to the door trim without causing dislocation by a strong tension, which improves the attaching (clamping) workability between itself and the door panel. Locking mechanism is provided on each of the inner member and the pressing member. As a result, the pressing member does not come into sliding contact with the elastic grommet main body while the grommet assembly is assembled to the door trim thus reducing the coefficient of friction and improving the assembly workability.

DETAILED DESCRIPTION OF THE PREFERRED EMBODIMENTS

FIGS. 1 through 6 show the first embodiment of a door grommet assembly according to the invention.

Figure 1:
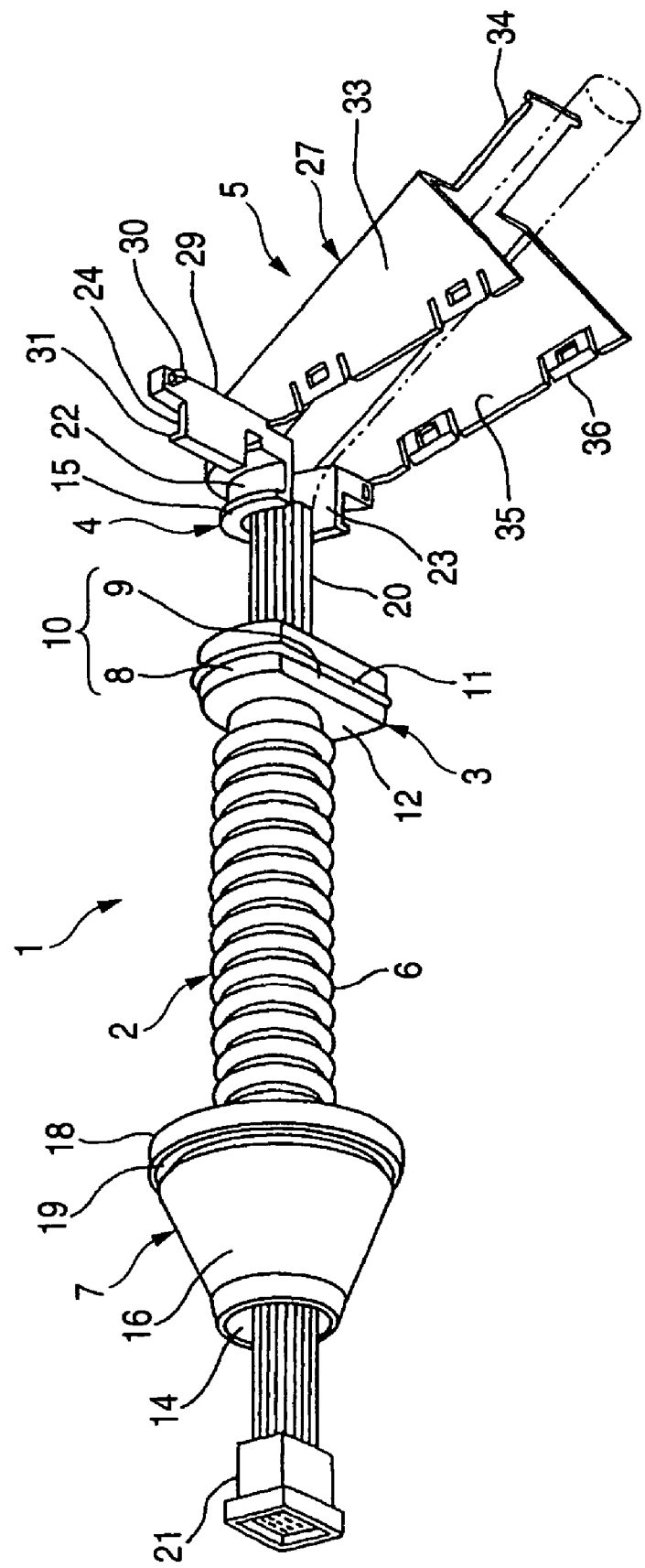
FIG. 1 is a perspective view of a grommet assembly in the course of assembling according to the first embodiment of the invention.

As shown in FIG. 1, the door grommet assembly 1 comprises an elastic grommet main body 2 made of a synthetic rubber and an integral inner-cover 5 made of a synthetic resin integrated with a hard opening-closing inner member 4 that is fitted into the collar part 3 of the grommet main body 2.

Figure 6:
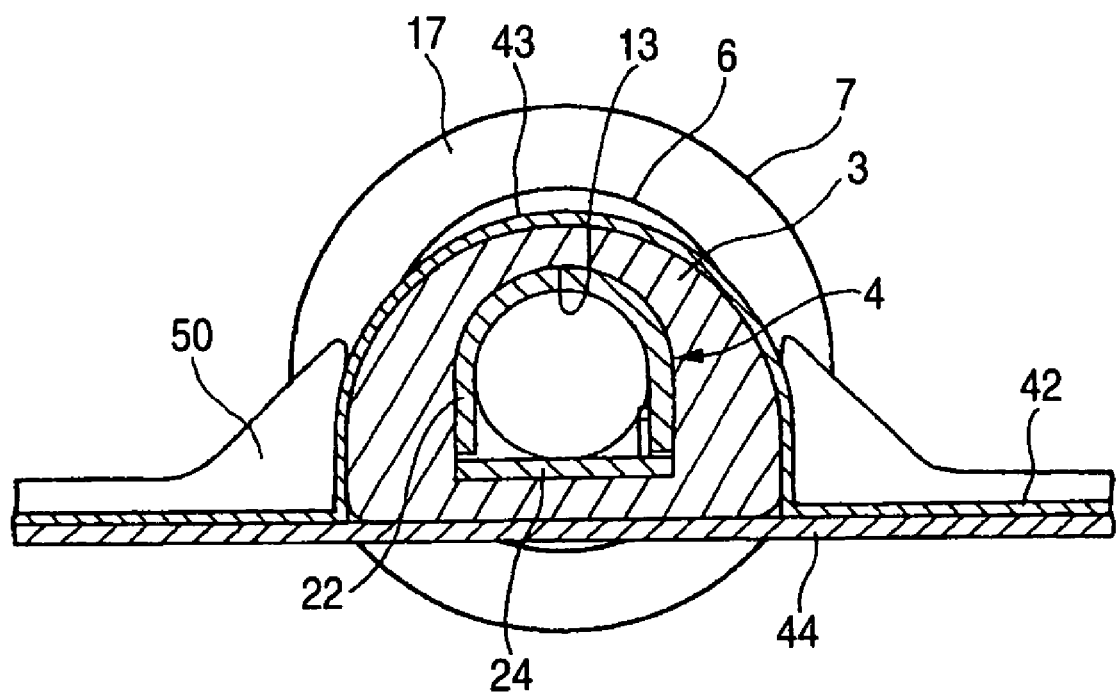
FIG. 6 shows a cross section taken along the line A-A of FIG. 5.

The grommet main body 2 comprises a telescopic bellows part 6, a collar part 3 formed integrally with the base end of the bellows part 6, and a cup-shaped part 7 formed integrally with the tip of the bellows part 6. The collar part 3 is formed slightly longer than a semicircle as seen from the front and comprises an outer peripheral wall 10 including curved outer peripheral surfaces 8 and a straight outer surface (plane) 9, a lip part 11 for reinforcing water resistance annularly formed at the center of the outer peripheral wall 10 in its peripheral direction (perimeter) integrally therewith, a wall 12 on the front side, and an opening 13 on the rear side (FIG. 6). The curved peripheral surface 8 has an approximately inverse U-shape and is composed of an arc-shaped upper half and a short straight lower half (plane), as shown in FIG. 1.

The base end of the bellows part 6 integrally follows the front wall 12 and inner member 4 is fitted into the opening 13 on the rear side. The opening 13 (FIG. 6) is in communication with the inner space (electric wire insertion space) 14 (FIG. 6) having a circular cross section of the bellows part via a hole in the front wall 12. In the opening 13 is formed a peripheral groove (not shown) for fitting the collar-shaped wall 15 at the front end of the inner member 4 into the peripheral wall 10 along the inner surface of the front wall 12.

The cup-shaped part 7 comprises a central electric wire insertion hole 14, a tapered wall 16 external to the insertion hole 14, a bottom wall 17 (FIG. 6) crossing the base end of the tapered wall 16, a large-diameter part projecting on the outer periphery of the bottom wall 17, and a peripheral groove 18 formed in front of the large-diameter part 18.

The bottom wall 17 (FIG. 6) integrally follows the bellows part 6 and the inner space of the bellows part is in communication with the insertion hole 14. A plurality of electric wires (wound bundle of electric wires) 20 are inserted into the insertion hole 14. The tapered wall 16 is inserted into the hole in the vehicle body (not shown). The large-diameter part 18 is in close contact with the vehicle body while the peripheral groove 19 is fitted to the peripheral edge of the hole. A connector 21 provided at the tip of the wound bundle of electric wires 20 is connected to the wire harness (not shown) on the vehicle body. At least the wound bundle of electric wires 20 and the grommet assembly 1 constitutes a wire harness. The wound bundle of electric wires is sometimes called a harness.

The inner member 4 at the front end of the integral inner-cover 5 has a shape tailored along the collar part 3 of the grommet main body 2 and comprises a peripheral wall 22 curved in an approximately inverse U-shape, a collar-shaped wall 15 at the front end of the peripheral wall 22, and an opening/closing lid wall 24 for closing the lower opening 23 of the peripheral wall 23 as shown in FIG. 1. The peripheral wall 23 is used to insert the electric wires 20 into the peripheral wall 22. The terms upper and lower herein assume a configuration shown in FIG. 1 and correspond to left and right in the actual usage case in FIG. 4.

Figure 2:
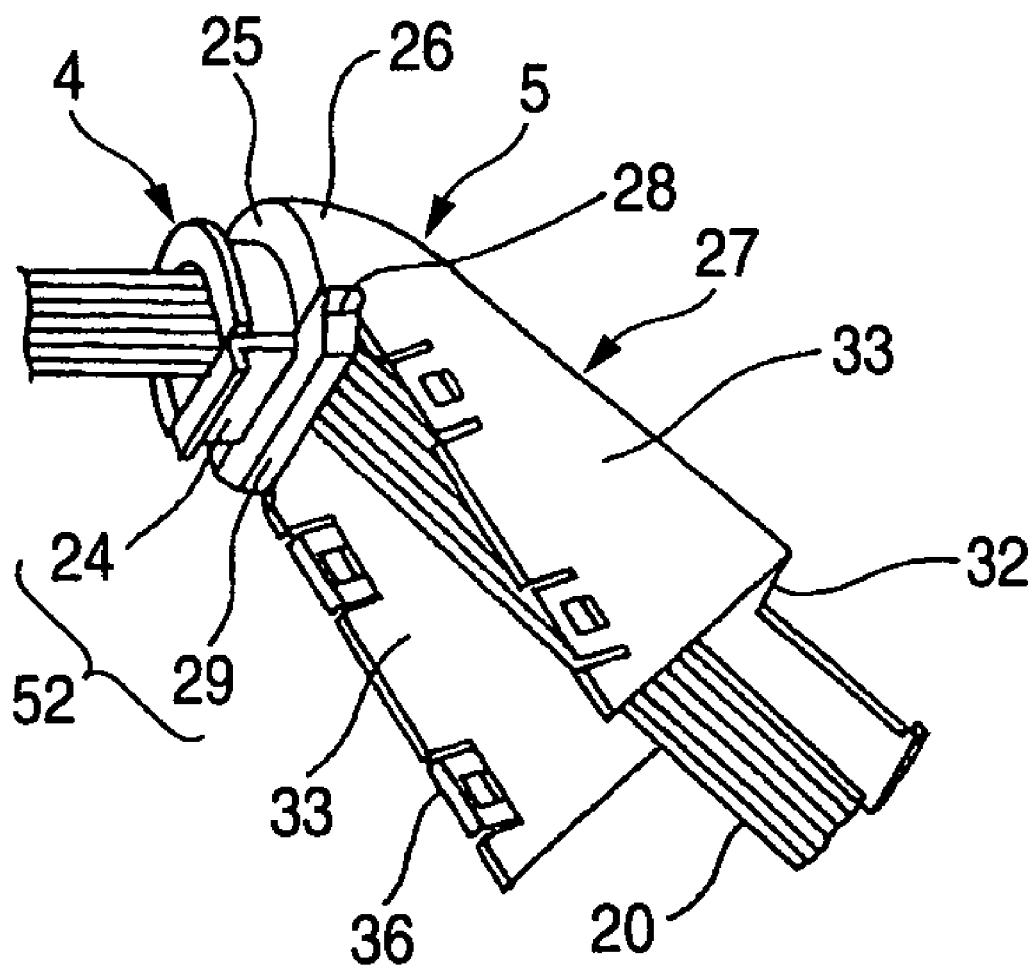
FIG. 2 is a perspective view of an integral inner-cover including the inner member of the grommet assembly.

As shown in FIGS. 1 and 2, the peripheral wall 22 of the inner member 4 orthogonally follows the collar-shaped wall 25 (FIG. 2) at the rear side. The collar-shaped wall 25 orthogonally follows the semi-annular wall (peripheral wall) 26 at the rear side. The collar-shaped wall 25 integrally and smoothly follows the cover main body (or simply the cover) at the rear side via the semi-annular wall 26. The semi-annular wall is also a part of the cover main body 27. The inner member 4 and the cover main body 27, both made of a synthetic resin, are integrated.

Under the semi-annular wall 26 is extendedly formed an opening (represented by a numeral 23). At one end of the opening 23 is provided a wide lid wall 29 in an openable manner via a thin hinge 28 (FIG. 2). At the front of the wide lid wall 29 is integrally formed a narrow lid wall 24. The wide lid wall 29 closes the opening extension 23 of the semi-annular wall 26 and the narrow id wall 24 closes the opening 23 of the inner member 4. Both of the lid walls 24, 29 form a lid member 52.

At the other end of the wide lid wall 29 is provided a locking part (locking jaw) 30. On the semi-annular wall 26 is provided a recessed groove or a hole as an engaging part for the locking jaw 30. The narrow lid wall 29 couples the semi-annular wall 26 to enhance the stiffness of the cover main body 27. At the front end of the narrow lid wall 24 is provided orthogonally a collar part 31 in downward direction. When the collar wall 24 is closed as shown in FIG. 2, the collar part 31 is positioned in a plane normal to a collar-shaped wall 15 at the front end to be engaged with the downward groove (not shown) in the wall 9 below the collar part 3 of the grommet main body 2. Cancellation of locking is easily made by causing the semi-annular wall 26 to be bent in the opening direction for example by using a jig rod.

The cover main body 27 comprises an upper board 32 (FIG. 2) following the semi-annular wall 26 rearward, a pair of side plates 33 on the left and right of the board 32, and a plate-shaped electric wire fixing part extended from the rear end of the board 33. The board 32 follows the semi-annular wall 26 in a slanted matter while being bent downward as shown in FIG. 2.

Figure 5:
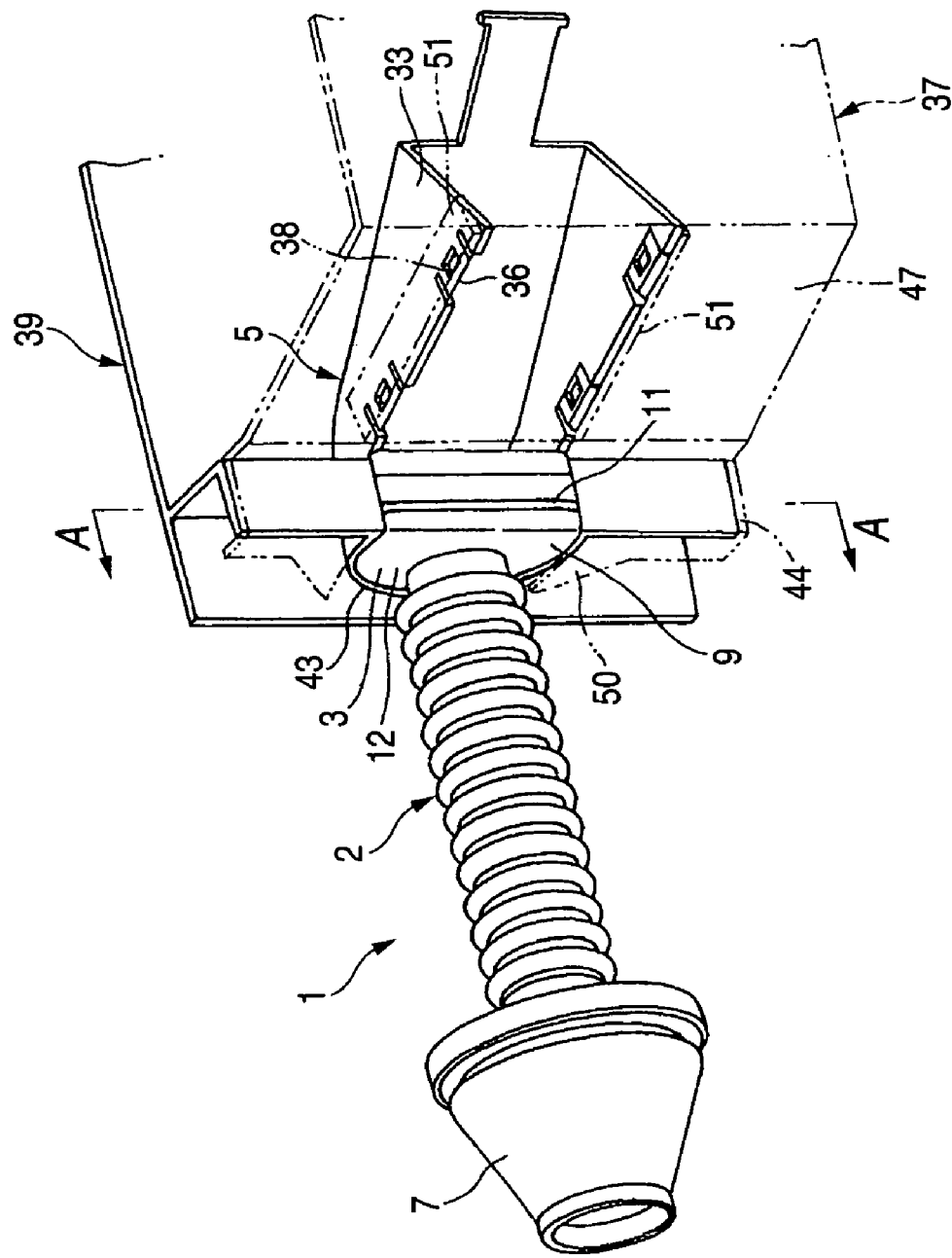
FIG. 5 is a perspective view of main parts showing the assembly state of the assembly structure of the grommet assembly.

An electric wire insertion space is formed while being surrounded by the board 32 and both side plates 33. The space follows the opening 35 at the tip of the side plates 33. The opening 35 follows the opening 23 of the inner member 4. At the tip of the side plate 33 is integrally provided a flexible locking frame piece 36 in the same plane as the former. As shown in FIG. 5 below, an engaging projection 38 for engaging the locking frame piece 36 is provided on the door trim 37. Cancellation of locking is easily made by causing the locking frame piece 36 to be bent.

Figure 3:
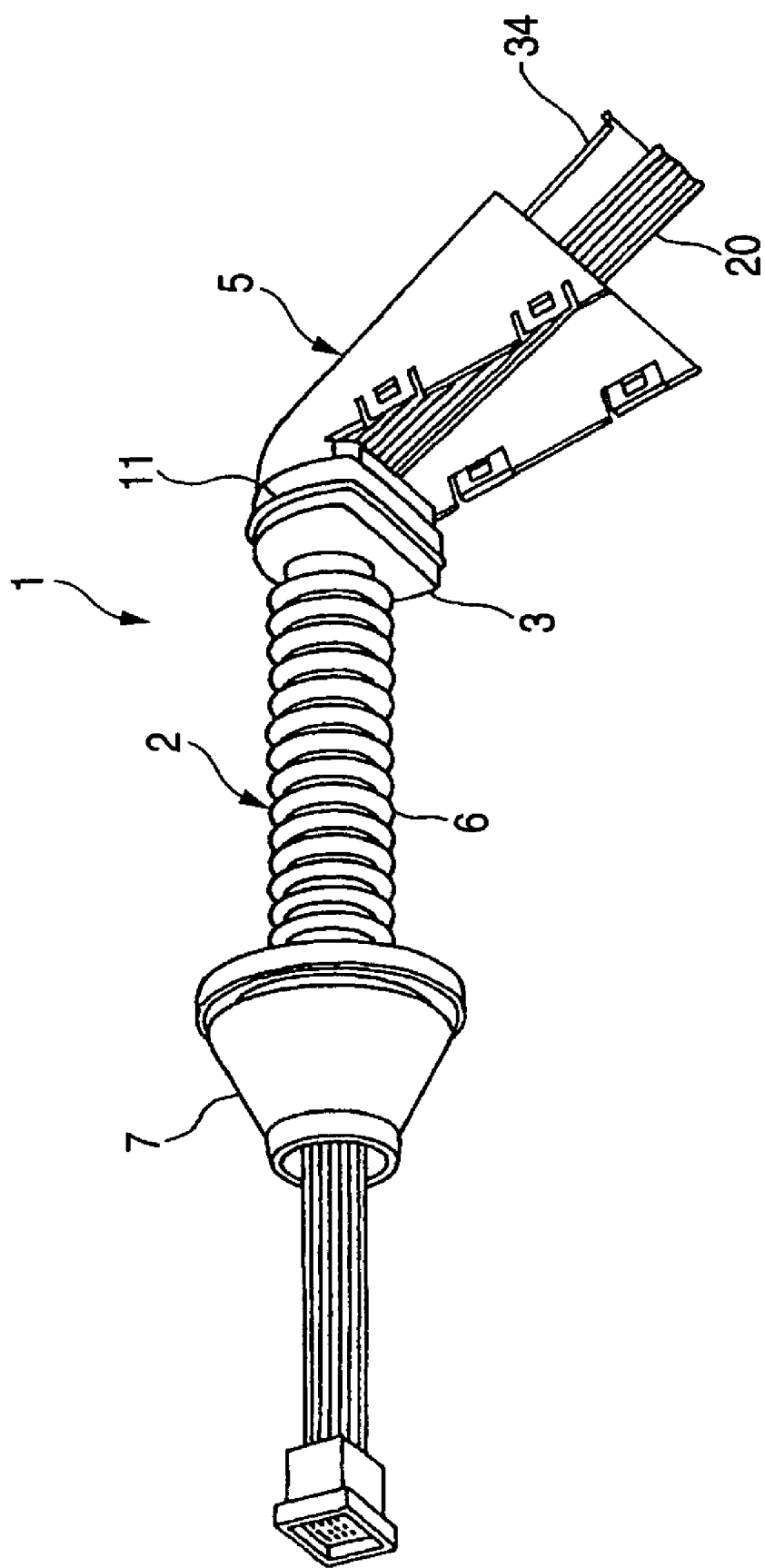
FIG. 3 is a perspective view of the assembled grommet assembly.

As shown in FIG. 1, with the wound bundle of electric wires 20 inserted into the grommet main body 2, the wound bundle of electric wires 20 is inserted into the integral inner-cover 5 from the openings 23, 35. As shown in FIG. 2, the lid walls 24, 29 on the side of the inner member are closed. As shown in FIG. 3, the inner member 4 is fitted into the collar part 3 of the grommet main body 2. The grommet assembly 1 is thus formed. The electric wires 20 are fixed to the wire fixing part 34 of the integral inner-cover by tape winding or band winding. Into the cup-shaped part 7 of the grommet main body 2 are inserted the electric wires 20 in a free manner (without being fixed) in order to absorb the opening/closing stroke of the automobile door by the bellows part 6.

The structure for assembling the grommet assembly 1 to the automobile door 1 will be described referring to FIGS. 4 through 6.

Figure 4:
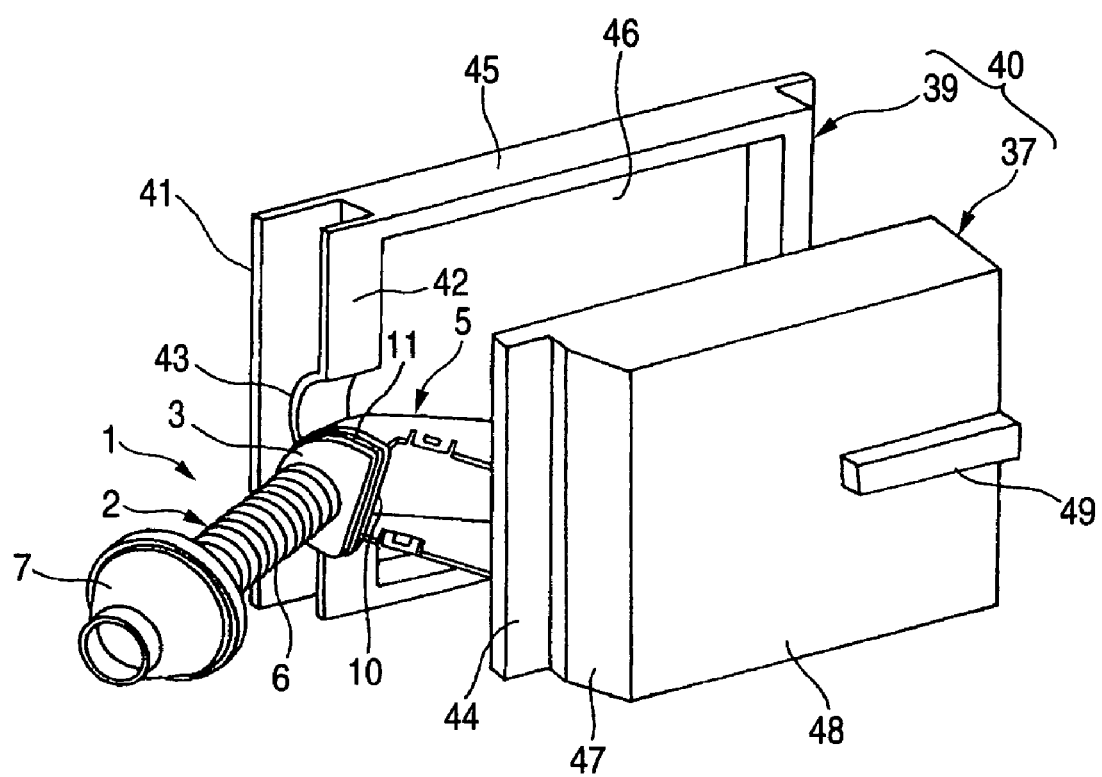
FIG. 4 is an exploded perspective view showing the pre-assembly structure of assembling the grommet assembly to an automobile door.

As shown in FIGS. 4 through 6, the collar part 3 of the grommet assembly 1 is clamped between the door panel 39 and the door trim 37 of the automobile door 40 in order to assure waterproofing effect. The integral inner-cover 5 is positioned inside the door trim 37. The bellows part 6 and the cup-shaped part 7 of the grommet main body 2 project forward from the automobile door 40. In FIG. 4, the automobile door 40 is schematically illustrated.

As shown in FIG. 4, the door panel 39 made of a metal or fiberglass is integrally composed of the door outer panel 41 and the door inner panel 42. On the vertical front wall (represented by a numeral 42) of the door inner panel 42 is formed an approximately semicircular (to be more precise, slightly longer than a semicircle) curved wall 43. As shown in FIG. 5 and FIG. 6 (cross section taken along the line A-A of FIG. 5), between the inner surface of the curved wall 43 and the flat front wall 44 of the door trim 37 made of a synthetic resin is clamped the outer peripheral wall 10 of the collar part 3 of the grommet main body 2.

Referring to FIG. 4, the front wall 42 of the door panel 39 and the front wall 44 of the door panel are bonded to each other in the plate thickness direction. The door inner panel 42 is formed in the shape of an approximately rectangular frame that integrally follows a frame-shape part 45. The frame-shape part 45 is closed by the door outer panel 41 to form therein an accommodating space 46 for accessories.

The door trim 37 has an inner space enclosed by a slanted wall 47 following the vertical front wall 44, a vertical side wall 48 following crosswise the slanted wall 47, and top, bottom and rear walls crossing the side wall 48. An arm rest 49 is provided on the side wall 48. The slanted wall 47 may be formed inside the front end wall (not shown).

As shown in FIG. 5, at the front end of the front wall 44 of the door trim 37 is orthogonally provided a pair of upper/lower projection wall 50 of an approximately triangular shape at the front and rear sides of the front wall 12 of the collar part 3 of the grommet main body 2. As shown in FIG. 6, the projection wall 50 is positioned along the curved wall 43 of the door panel 39.

As shown in FIG. 5, for example on the inner surface of the slanted wall 47 of the door trim 37 is erected a pair of upper/lower salient plate 51. On the inner surface of each salient plate 51 is arranged an engaging projection 38. The upper and lower side walls of the integral inner-cover 5 advance inside each salient plate 51 to be positioned and supported there. The engaging projection 39 is engaged with the locking frame piece 36 of each side plate 33 so that the integral inner-cover 5 is fixed to the door trim 37. The electric wires 20 (FIG. 3) are reliably protected without being interfered with accessories inside the automobile door by the integral inner-cover 5.

In FIG. 4, as a method for assembling the grommet assembly 1, the integral inner-cover 5 of the grommet assembly 1 where the electric wires 20 are inserted is first fixed to the door trim 37 to configure a door trim assembly with the grommet assembly 1 and the door trim 37. The door trim assembly is assembled to the door panel 39 and the collar part 3 of the grommet main body 2 is clamped between the panels 37, 39. To the door trim 37 are assembled accessories such as a switch unit and a loudspeaker (not shown) as will as the grommet assembly. Theses components compose a door trim module.

This assembly method (assembly structure) allows the grommet main body 2 to be assembled to the automobile door 40 simply and reliably without using related art screw fastening mechanism, which improves the workability of assembling the grommet assembly 1 to the automobile door 40. When electric wires 20 is the inner member 4 (FIG. 1) of the integral inner-cover 5, the electric wires 20 are readily inserted into the inner member 4 with the lid walls 24, 39 open. This eliminates cumbersome work of inserting electric wires into the hole in a related art inner member, thereby improving the assembly workability of the electric wires 20.

As shown in FIG. 6, the outer peripheral surface of the inner member 4 is in close elastic contact with the inner peripheral surface of the collar part 3 of the grommet main body 2 in order to suppress possible collapse or deformation of the collar part 3 caused by an external pressure. The outer peripheral surface (especially the lip part 11 on the outer periphery) of the collar part 3 is in close elastic contact with the inner surface of the curved wall 43 of the door panel 39 and the inner surface of the front wall 44 of the door trim 37 so as to provide favorable water resistance. In FIG. 6, a numeral 4 represents a bellows part, 7 a cup-shaped part, and 14 an electric wire insertion hole.

While two kid walls 24, 29 are arranged at the front and rear sides of the integral inner-cover 5 in this embodiment as shown in FIG. 2, it is possible, for example, to provide a lid wall 24 alone for closing the opening 23 of the inner member 4. In this case, the lid wall 24 is coupled via a thin hinge to one end of the peripheral wall 22 of the inner member 4 and locked to the inner surface at the other end of the peripheral wall 22 by locking mechanism.

While the lid member 52 of the integral inner-cover 5 is integrally coupled via the hinge 28 in the above embodiment, it is possible to separately form the lid member 52 without using a hinge and lock the lid member 52 to the integral inner-cover 5 by way of the locking mechanism on both sides of the lid member 52.

The shape of the grommet main body 2 is not limited to that of the above embodiment. For example, the grommet main body 2 may comprise a collar part 3, a telescoping part (6) and a front end fitting part (7). Or, the grommet main body comprising at least collar part 3 may be used.

While the integral inner-cover 5 is fixed to the door trim 37 by the locking mechanism 36, 38 in the above embodiment, the integral inner-cover 5 may be locked to the door panel 29 instead of the door trim 37. In this case, the integral inner-cover 5 is formed straight without inclination or slanted toward the door panel 39. As locking mechanism, a locking frame piece (36) may be arranged on the door trim and a locking projection (38) may be arranged on the cover main unit 27.

While the curved wall 43 is arranged on the door panel 39 and the flat wall 44 is arranged on the door trim 37 in the above embodiment, it is possible to arrange the curved wall (43) on the door trim 37 and arrange the flat wall (44) on the door panel 39. This is also the case with the second embodiment described later.

FIGS. 7 through 16 show the second embodiment of a door grommet assembly and its assembly structure according to the invention.

Figure 7:
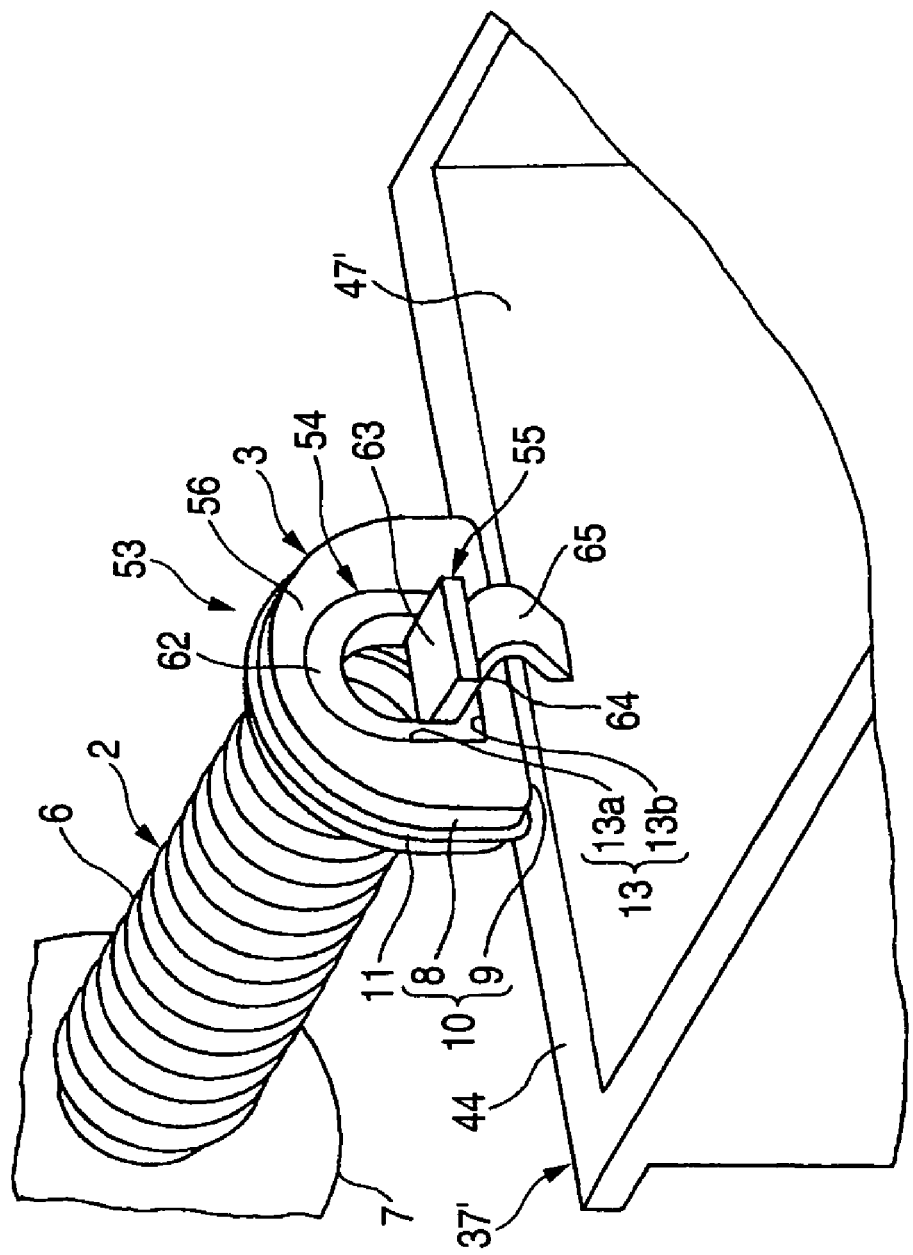
FIG. 7 is a perspective view of a grommet assembly in the course of assembling according to the second embodiment.

As shown in FIG. 7, the door grommet assembly 53 is composed of an elastic grommet main body 1 made of a synthetic rubber and a hard inner member 54 made of a synthetic resin fitted to the inside of the collar part 3 of the grommet main body 2. The inner member 54 is pushed by the pressing member 55 on a door trim 37' so as to bring the collar part of the grommet main body 2 into close contact with the front wall 44 of the door trim 37'.

The shape of the grommet main body 2 is similar to that in the first embodiment. The grommet main body 2 is composed of a bellows part 6 integrally fallowing the collar part 3 and a cup-shaped part 7 integrally following the bellows part 6. The collar part 3 comprises an outer peripheral wall 10 including an outer peripheral surface 8 and a straight plane 9 connecting both sides of the outer peripheral surface 8, a lip part formed annularly and integrally on the outer peripheral wall 10, and front and rear walls 12 (FIG. 10), 56 parallel to each other.

Inside the collar part 3 is provided a hole enclosed by an inner peripheral wall 13a of an approximately inverse U-shape and a straight plane wall 13b connecting the bottom of the inner peripheral wall 13a. The hole 13 is in communication with the space inside the bellows part 6. A curved inner peripheral surface 13a comprises short straight planes on the lower left and right. Inside the hole 13 is fitted the inner member 54. The cup-shaped part 7 (FIG. 10) comprises a peripheral groove 19 fitted to the hole of a vehicle body (not shown) and a large-diameter part 18 in contact with the peripheral edge of the hole.

Figure 8:
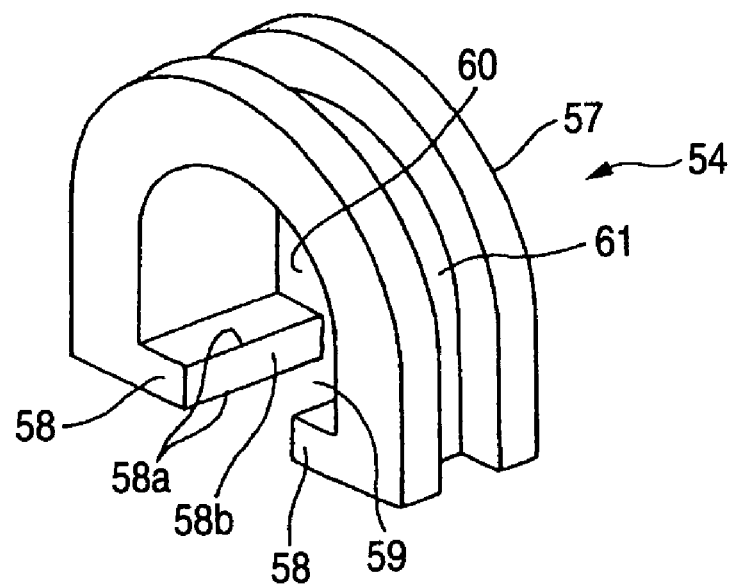
FIG. 8 is a perspective view showing the inner member of the grommet assembly.

As shown in FIG. 8, the inner member 54 is formed in an approximately inverse U-shape and is composed of a peripheral wall 57 of an inverse U-shape and a pair of salient walls 58 opposed to each other that project inward at the base end of the peripheral wall 57. The salient walls 58 comprises inner and outer (top and bottom in FIG. 8) surfaces 58a and parallel surfaces 58b opposed to each other. Between the pair of salient walls is notched a rectangular opening 59. The opening 59 is in communication with the inner space of the peripheral wall 57. A peripheral groove is formed at the center of the peripheral wall 57 in its width direction. The peripheral wall 57 is composed of an arc-shaped upper half and a straight lower half following the arc-shaped upper half.

As shown in FIG. 7, the rear end face of the inner member 54 is positioned in the same vertical plane as the rear end face of the collar part 3 of the grommet main body 2. The pressing member 55 on the door trim 37' is engaged with the opening 59 at the base end of the inner member 54 and the inner surface 58a of the pair of salient walls 58. The energization force of the pressing member 55 brings the collar part 3 of the grommet main body 2 into close contact with the front wall 44 of the door trim 37'.

Figure 9:
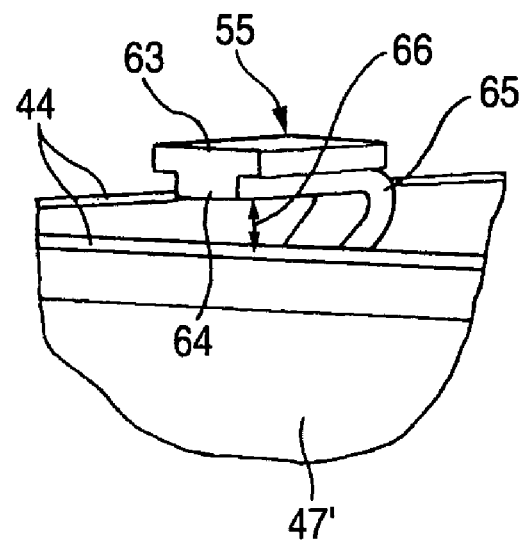
FIG. 9 is a perspective view showing the pressing member on the door trim for fixing the grommet assembly.

As shown in FIGS. 7 and 9, the pressing member 55 is composed of a flat wide board (wide part) 63, a narrow part 64 integrally projecting from the bottom center of the board 63, and a support part 65 of a slanted plate shape folded in an approximate V-shape integrally following the narrow part 64. The support part 65 is elastic. The narrow part 64 is elastically bendable in the plate thickness direction integrally with the board 63 with the intersection of the support part 6 and the narrow part 64 as the fulcrum.

The narrow part 64 is engaged with the opening 59 in the inner member 54. The inner surface of the narrow part 64 is pressure contact with the inner surface of the collar part 3. The sides of the board (part that is wider than the narrow part 64) are in pressure contact with the pair of salient walls 58 (refer to FIG. 11). The narrow part 64 is engaged with the opening 59 so that the grommet assembly 53 is correctly positioned on the door trim 37'.

The support part 65 follows the inner surface of the front wall 47' of the door trim 37' obliquely crosswise. The narrow part 64 and the board 63 are positioned in parallel while opposed to the front wall 44 orthogonal to the front wall 47'. Between the front wall 44 and the narrow part 64 is formed a gap 66 that is slightly narrower than the thickness of the straight wall 9 at the bottom of the collar part 3. It is possible to form the pressing member 55 with a metal instead of a resin material and fix the pressing member 55 to the door trim 37' via insert molding.

In FIG. 7, in the grommet main body 2 and the inner space of the inner member 54 are inserted electric wires (not shown) In that state, the grommet assembly 53 is temporarily fixed to the door trim 37' by the pressing member 55. The resulting door trim 37' is assembled to the door panel 39' (FIG. 10).

It is readily possible to externally insert the inner member shown in FIG. 8 into the electric wires from the opening 59 to assemble the grommet main body 2 to the collar part 3, with the wound bundle of electric wires (not shown) inserted into the grommet main body 2. Thus, it is readily possible to insert the electric wires into the inside of the inner member 54 from the opening 59.

Figure 10:
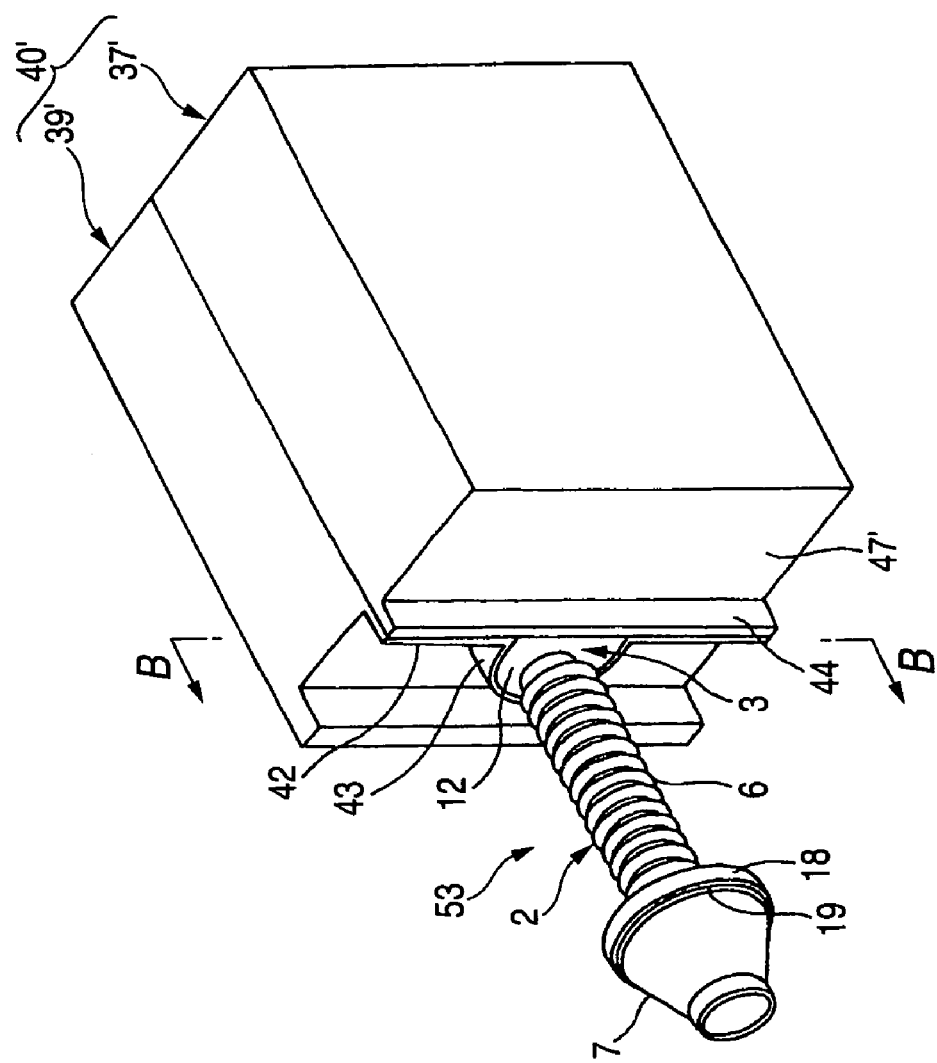
FIG. 10 is a general perspective view showing the structure of assembling the grommet assembly to an automobile door.

As shown in FIG. 10, the door trim 37' with the electric wires (not shown) and the grommet assembly 53 attached is assembled to the door panel 39'. The shape of the door panel 39 is the same as that in the first embodiment and is formed in a vacant manner comprising a curved wall 43 extendedly formed while being integral with the front wall 42, and front, rear, top and bottom walls. The shape of the door trim 37' is almost same as that in the first embodiment except that a vertical front wall 47' is formed instead of the slanted wall 47 (FIG. 4). The door trim 37' is fixed to the door panel 39' via a single action using a locking clip or the like. This is similar to the first embodiment.

Figure 11:
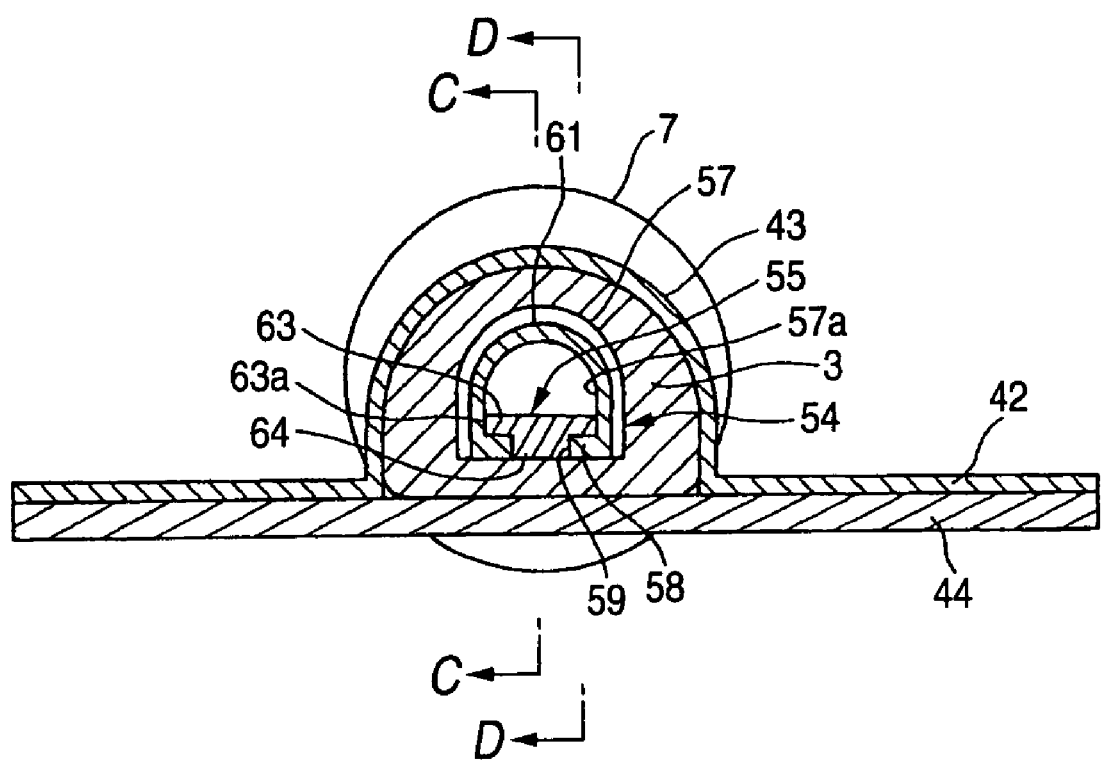
FIG. 11 shows a cross section taken along the line B-B of FIG. 10.
Figure 12:
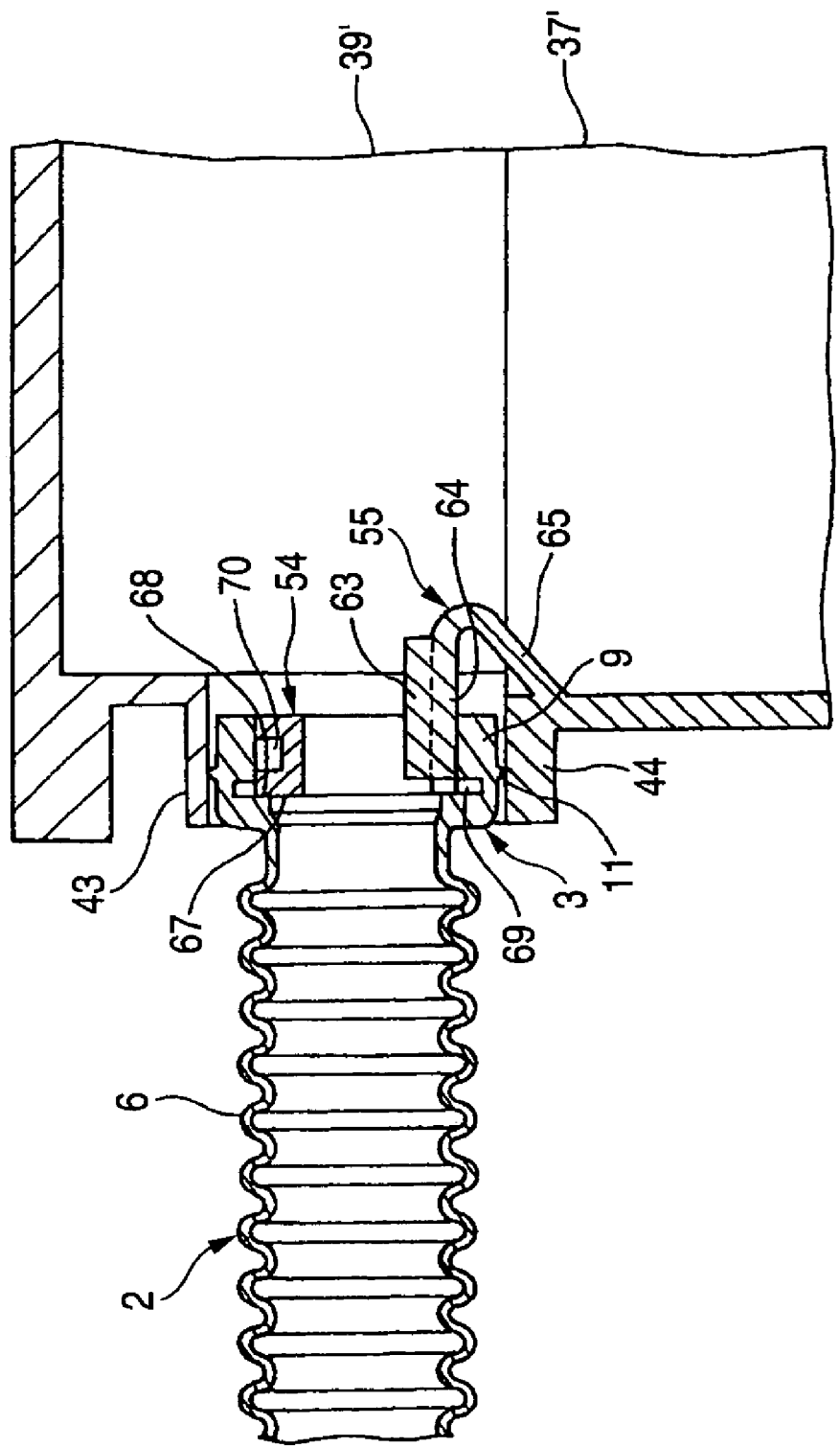
FIG. 12 shows a cross section taken along the line C-C of FIG. 11.

As shown in FIGS. 10 and 11 (cross section taken along the line B-B of FIG. 10), the collar part 3 of the grommet main body 2 is clamped between the curved wall 43 of the door panel 39' and the flat front wall 44 of the door trim 477. As shown in FIG. 12 (cross section taken along the line C-C of FIG. 11), the lip part 11 on the periphery of the collar part 3 is in close contact with the curved wall 43 and the inner surface of the front wall 44.

Further, the pressing member 55 pushes the straight wall 9 at the bottom of the collar part 3 of the grommet main body 2 against the front wall 44 of the door trim 37'. The pressing member 55 pushes the straight wall 9 of the collar part 3 against the front wall 44 of the door trim 37' from outside the inner member 54 (via the inner member 54). This reliably provides adhesion between the door trim 37' and the collar part 3 thus improving water resistance.

The pressing member 55 is fitted into the opening 59 of the inner member 54. This enhances the stiffness of the inner member 54. The inner member 54 and the pressing member 55 altogether prevent possible collapse or deformation of the collar part 3 caused by an external pressure and the outer peripheral surface of the collar part 3 reliably brings the door panel 39' and the door trim 37' in close contact. The pressing member 55 serves as a lid 24 in the first embodiment.

In FIG. 12, the front end face 67 of the inner member is in close contact with the front end face 68 in the hole provided in the collar part 3. It is possible to arrange a collar wall (not shown) on the outer periphery of the front end of the inner member 54 and engage the collar wall with the peripheral groove in the inner surface of the collar part 3 of the grommet main body 2. It is also possible to engage the rib (not shown) on the inner periphery of the collar part 3 with the groove 61 in the outer periphery of the inner member 54. In FIG. 11, the numeral 7 represents the cup-shaped part of the grommet main body 2.

Figure 13:
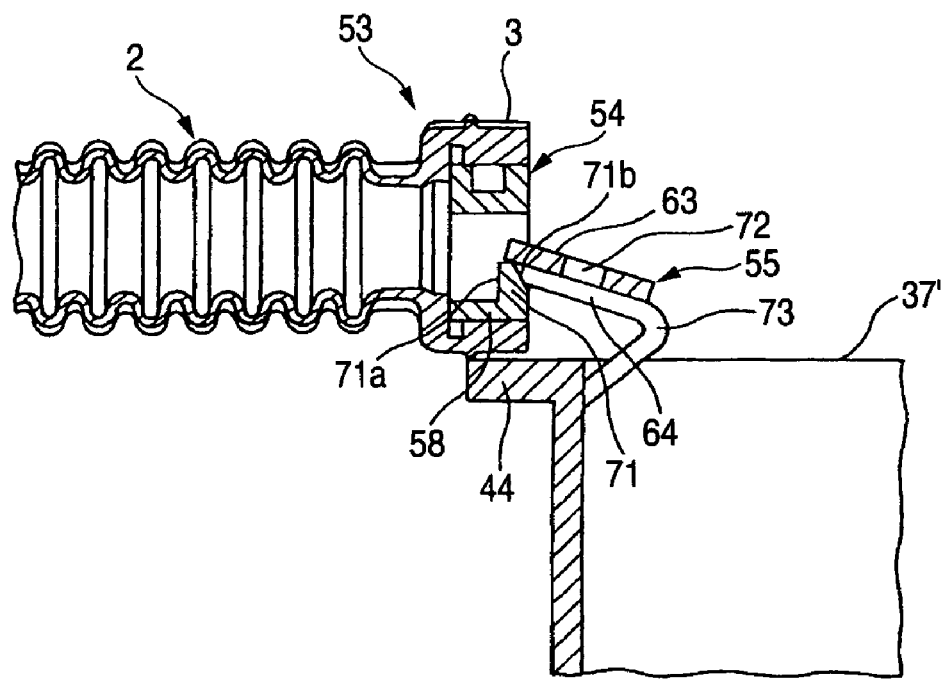
FIG. 13 is a cross-sectional view before locking that shows a variation of the assembly structure of the grommet main body (locking structure corresponding to the D-D section shown in FIG. 11)
Figure 14:
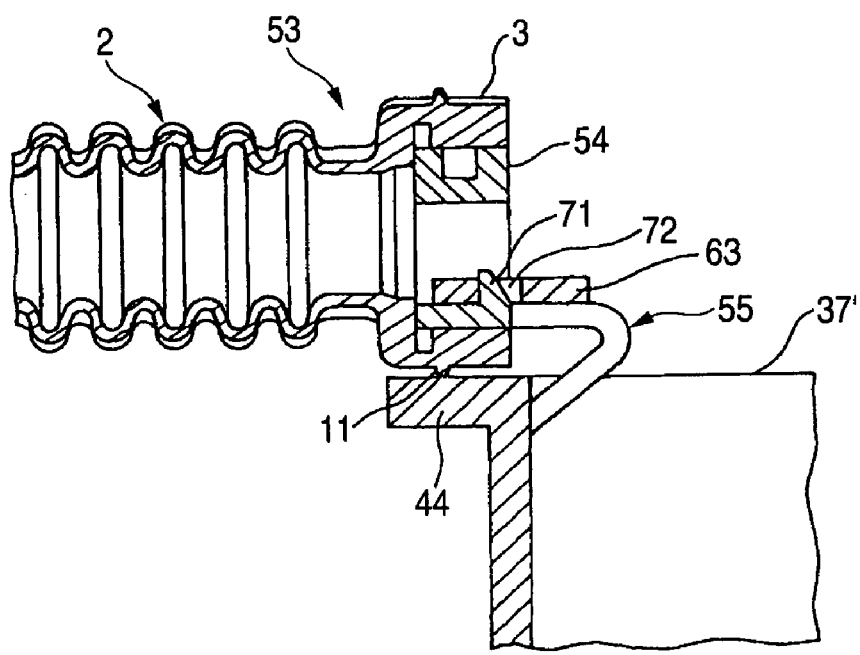
FIG. 14 is another cross-sectional view showing the locking structure.
Figure 15:
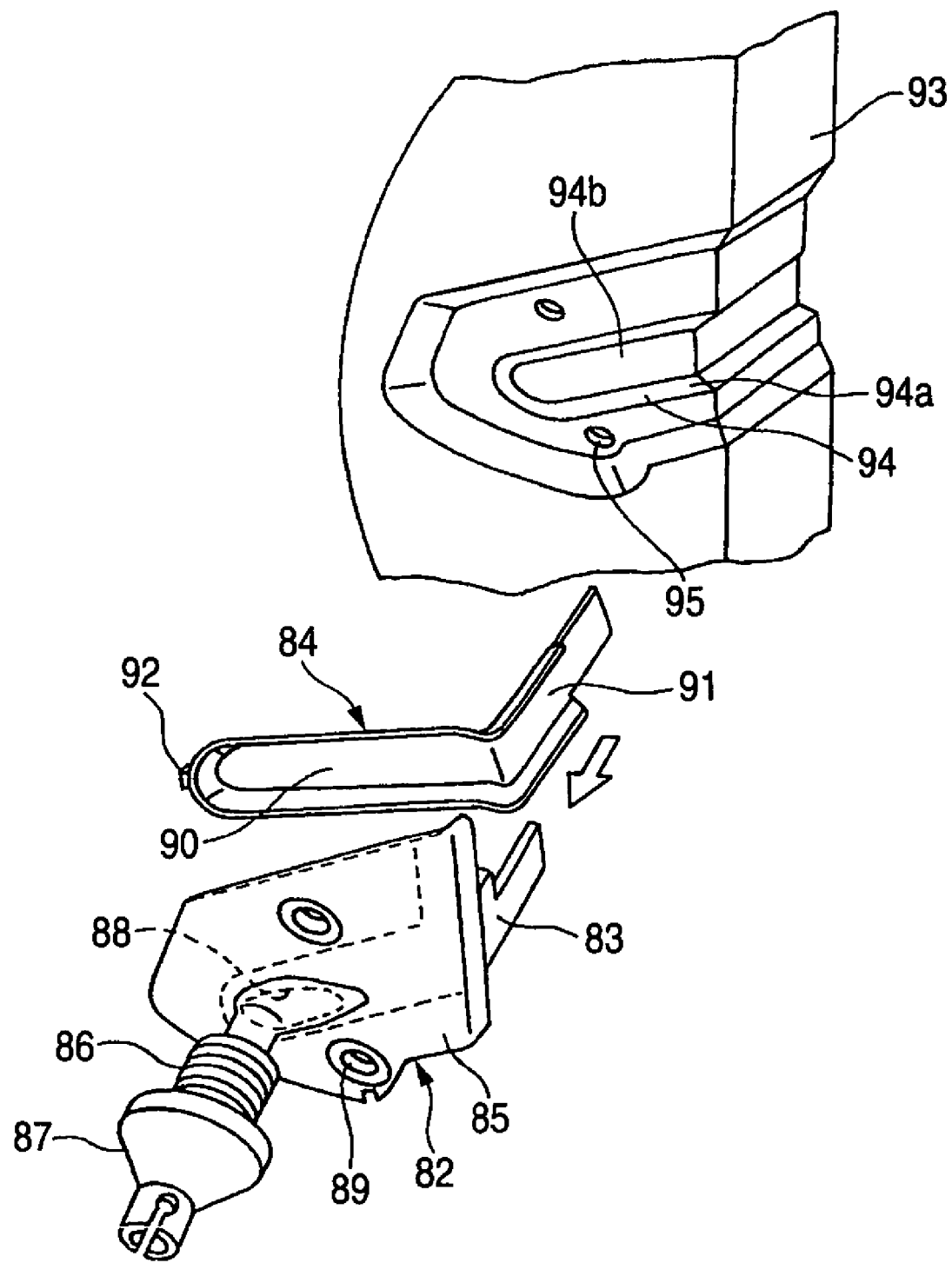
FIG. 15 is an exploded perspective view showing an embodiment of a related art grommet main body.
Figure 16:
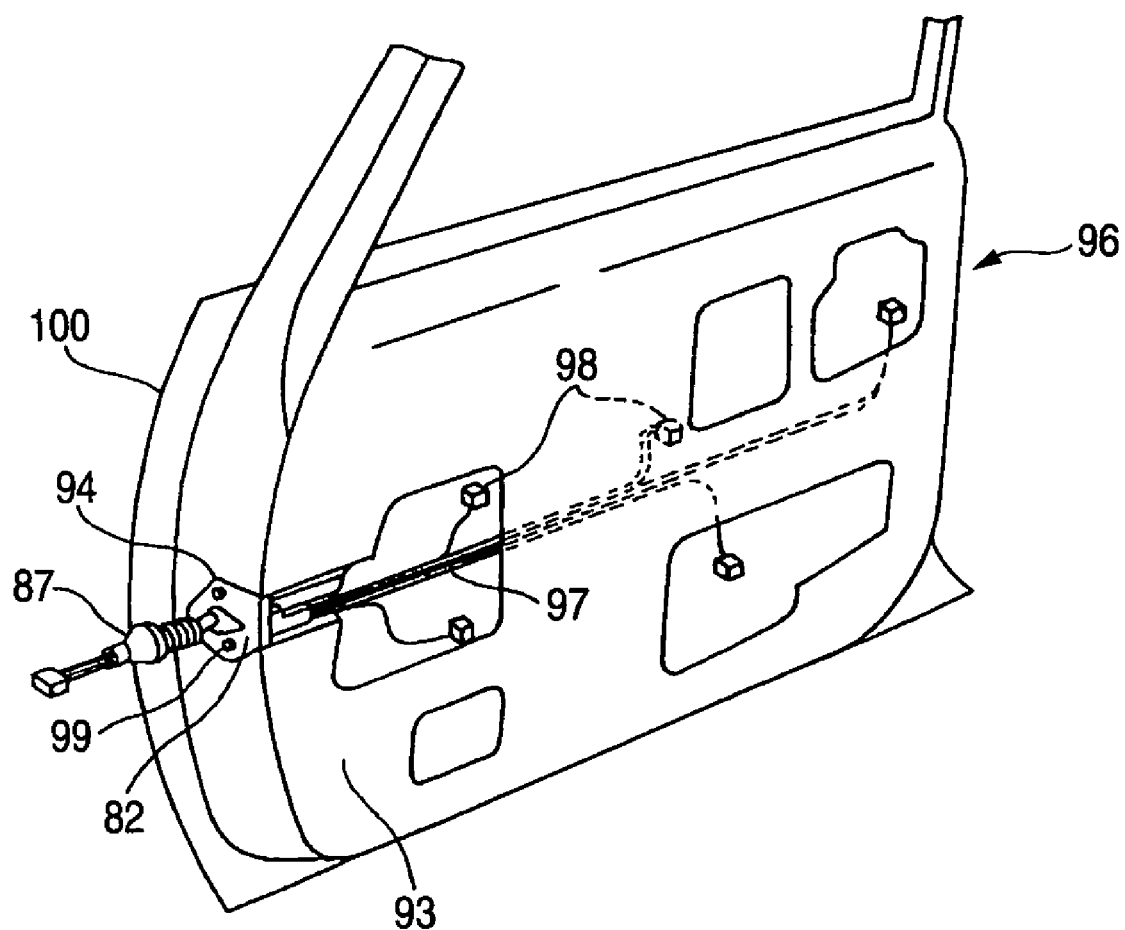
FIG. 16 is a perspective view showing the structure of assembling the grommet assembly to an automobile door.

FIGS. 13 through 14 correspond to the D-D cross section of FIG. 11 and show an embodiment of locking mechanism for locking the inner member 54 and the pressing member 55.

At the rear end of the inner surface of the pair of left and right salient walls 58 are provided locking projections 71. In the left and right sides of the board 63 of the pressing member 55 are notched engaging recessed parts 72 for engaging the locking projections 71. The locking projection 71 according to the embodiment includes a front vertical locking face 71a and a rear slanted guide face 71b. The engaging recessed part 72 is a rectangular notched groove formed at the center between both sides of the board 63. The depth of the engaging recessed part 72 reaches the outer surface of the narrow part 64. As shown in FIG. 11, the outer surface 63a of the board 63 is inn contact with the inner side surface 57a of the inner member 54 so that the engaging recede part 72 is closed by the inner side surface 57a of the inner member 54 and takes the form of a rectangular shape.

As shown in FIG. 13, the collar part 3 of the grommet main body 2 is caused to slide along the front wall 44 of the door trim 37'. The board 63 of the pressing member 55 rides on the slanted face 71b of the locking projection 71. The board 63 and the narrow part 64 of the pressing member 55 are integrally bent upward with the curved part 73 as a fulcrum. As shown in FIG. 14, when the locking projection 71 reaches the engaging recessed part 72, the pressing member 55 is elastically restored to engage the locking projection 71 with the engaging recessed part 72.

This firmly secures the grommet assembly 53 in back-and-forth direction and right-and-left direction. The pressing member 55 pushes the grommet assembly 53 downward so that it is temporarily secured in vertical direction also. The lip part 11 of the outer periphery is in extremely close contact with the front wall 44. The back-and-forth direction refers to the longitudinal direction of the grommet main body 2 that matches the back-and-forth direction of an automobile door 44'. The vertical direction and right-and-left direction are conveniently used for illustration.

In FIG. 13, the board 63 of the pressing member 55 slides along the locking projection 71 of the inner member 54 while the pressing member 55 is bent upward. This avoids sliding contact between the pressing member 55 and the collar part 3 of the grommet main body 2 made of rubber. This reduces the resistance of assembly of the grommet assembly 53 to the door trim 37' and allows the grommet assembly 53 to be assembled to the door trim 37' smoothly and easily.

In the state of FIG. 14, the door trim 37' is assembled to the door panel 39' as shown in FIGS. 10 through 12. This clamps the collar part 3 of the grommet main body 2 between the door panel 39' and the door trim 37' to provide final fixing. Even in case a force in the back-and-forth direction (pulling force or compressing force) is exerted in this state, the grommet assembly 53 is not shifted or dislocated. Locking that uses the pressing member 55 has a simpler and more compact structure than the locking by using the integral inner-cover 5 in the first embodiment (FIG. 1).

In the locked state of FIG. 14, the narrow part 64 at the center of the pressing member 55 is in close contact with the inner surface of the collar part 3 of the grommet main body 2 to push the collar part 3 against the door trim, as shown in FIG. 12. Cancellation of locking of the pressing member 55 and the inner member 54 is easily made by pushing the board 63 in the bending direction.

While the inner member 54 alone is used in the second embodiment unlike the embodiment shown in FIG. 1 where the cover main body 27 is formed, it is possible to integrally form a cover main body (27) shown in FIG. 1 at the rear end of the inner member 54 of FIG. 14 to protect electric wires. In this case, the locking frame piece 36 on the cover main body 27 and the engaging projection 38 on the door trim shown in FIG. 1 may be done without.

The shape of the pressing member 55 is not limited to that shown in the above embodiment. It is possible to form a curved or rectangular support part instead of the slanted support part 65. It is possible to form the support part 65 in a rod shape instead of a plate shape. It is also possible to eliminate the board 63 and provide the narrow part 64 (narrow board) alone following the support part 65, or eliminate the narrow part 64 and provide the wide board 63 alone following the support part 65.

As locking mechanism for the pressing member 55 and the inner member 54, it is possible to arrange a locking projection (71) on the pressing member 55 and arrange an engaging recessed part (72) to receive the locking projection on the inner member 54. The locking mechanism is not limited thereto. Various configurations are possible including an engaging recessed part for engaging an elastic locking arm with the projection of the locking arm.

While the pressing member 55 is arranged on the door trim 37' in the above embodiment, it is possible to arrange the pressing member 55 on the door panel 39' instead of the door trim 37' and temporarily fix the grommet assembly 53 to the door panel 39'.

The assembly structure of the grommet assembly 1, 53 according to the above embodiments is applicable to the front doors 40, 40 of an automobile as well as rear doors, a back door and a door of a vehicle other than an automobile.

What is claimed is:

1. A grommet assembly comprising:
   an elastic grommet main body; and
   a hard inner member fitted into a collar part of the grommet main body,
   wherein the inner member includes a peripheral wall which surrounds the majority of an outer circumference of an electric wire; and
   wherein an opening through which the electric wire is inserted is notched in a portion of the peripheral wall of the inner member,
   wherein said opening is closed by a lid wall through a locking mechanism.

2. The grommet assembly according to claim 1, wherein said inner member is integrated with a cover for protecting electric wires.

3. The grommet assembly according to claim 2, wherein said cover has an electric wire fixing part.

4. The grommet assembly according to claim 1, wherein the peripheral wall is substantially U-shaped and the opening is at the top of the U-shape.

5. The grommet assembly according to claim 4, wherein the opening is closed by a lid with two ends;
   wherein a first end of the lid is integrally attached with the peripheral wall at a first side of the opening and the second end of the lid is attachable to the peripheral wall at a second side of the opening.

6. The grommet assembly according to claim 5, wherein an outer wall of the collar part corresponds to the U-shape of the peripheral wall.

7. An assembly structure of a grommet assembly to an automobile door, comprising:
   a grommet assembly including an elastic grommet main body, and a hard inner member fitted into a collar part of the grommet main body,
   wherein the inner member includes a peripheral wall which surrounds the majority of an outer circumference of an electric wire; and
   wherein an opening through which the electric wire is inserted is notched in a portion of the peripheral wall of the inner member,
   wherein the automobile door includes a door trim,
   wherein said inner member is integrated with a cover for protecting electric wires, and said cover is locked to said door trim by a locking mechanism.

8. The assembly structure of a grommet assembly to an automobile door according to claim 7, further comprising the automobile door including a door panel, wherein an outer peripheral surface of said collar part is secured while being clamped by said door panel and said door trim.

9. The assembly structure of a grommet assembly to an automobile door according to claim 7, wherein the peripheral wall is substantially U-shaped and the opening is at the top of the U-shape.

10. The assembly structure of a grommet assembly to an automobile door according to claim 9, wherein the opening is closed by a lid with two ends;
    wherein a first end of the lid is integrally attached with the peripheral wall at a first side of the opening and the second end of the lid is attachable to the peripheral wall at a second side of the opening.

11. The assembly structure of a grommet assembly to an automobile door according to claim 10, wherein an outer wall of the collar part corresponds to the U-shape of the peripheral wall.

12. An assembly structure of a grommet assembly to an automobile door, comprising:
    a grommet assembly including an elastic grommet main body, and a hard inner member fitted into a collar part of the grommet main body,
    wherein an opening through which an electric wire is inserted is notched in a portion of a peripheral wall of the inner member;
    further comprising the automobile door including a door panel and a door trim, wherein an outer peripheral surface of said collar part is secured while being clamped by said door panel and said door trim; and
    wherein a lip part provided on the outer peripheral surface of said collar part is in close contact with said door panel and said door trim.

13. An assembly structure of a grommet assembly to an automobile door, comprising:
    a grommet assembly including an elastic grommet main body, and a hard inner member fitted into a collar part of the grommet main body,
    wherein an opening through which an electric wire is inserted is notched in a portion of a peripheral wall of the inner member;
    further comprising the automobile door including a door trim,
    wherein an elastic pressing member is provided on said door trim, and
    said pressing member is engaged with an inner surface of the collar part of said grommet main body so as to clamp the collar part with the door trim.

14. The assembly structure of a grommet assembly to an automobile door according to claim 13, wherein said pressing member includes a narrow part engaged with said opening of said inner member and a wide part in pressure contact with the projection walls on both sides of the opening.

15. The assembly structure of a grommet assembly to an automobile door according to claim 13, wherein said inner member and said pressing member are locked by a locking mechanism.

* * * * *